May 19, 1936.  H. H. CHESNY  2,041,048
FILTER APPARATUS AND METHOD
Filed July 31, 1933     2 Sheets-Sheet 2
FIG_2_
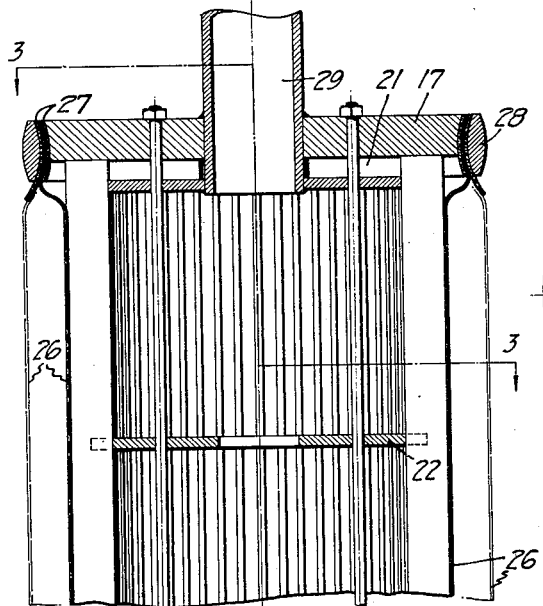
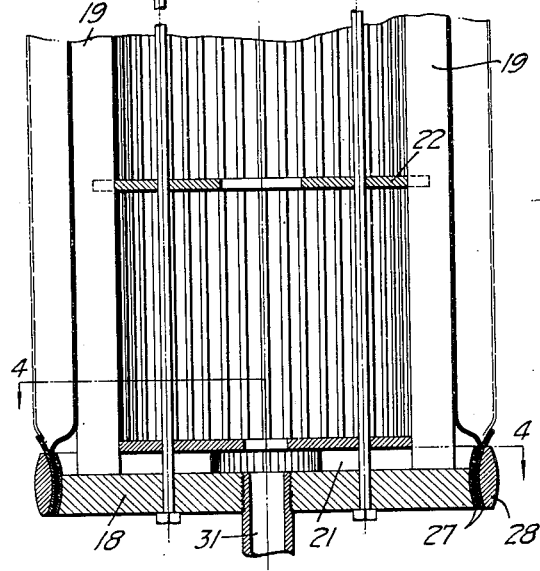
FIG_3_
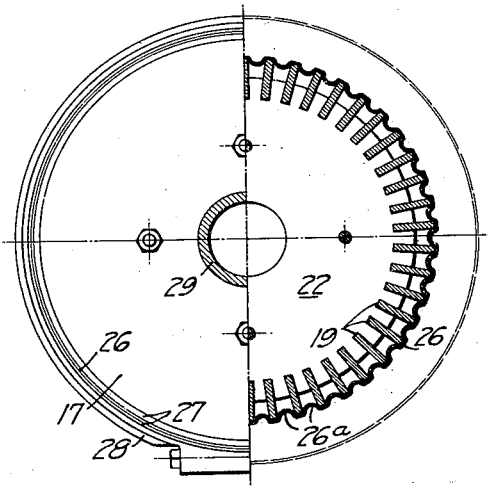
FIG_4_
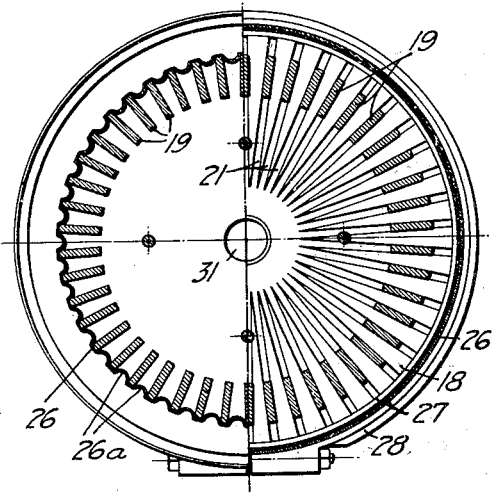
INVENTOR
Heinz H. Chesny
BY
White, Prost, Fehr & Lothrop
ATTORNEYS Patented May 19, 1936

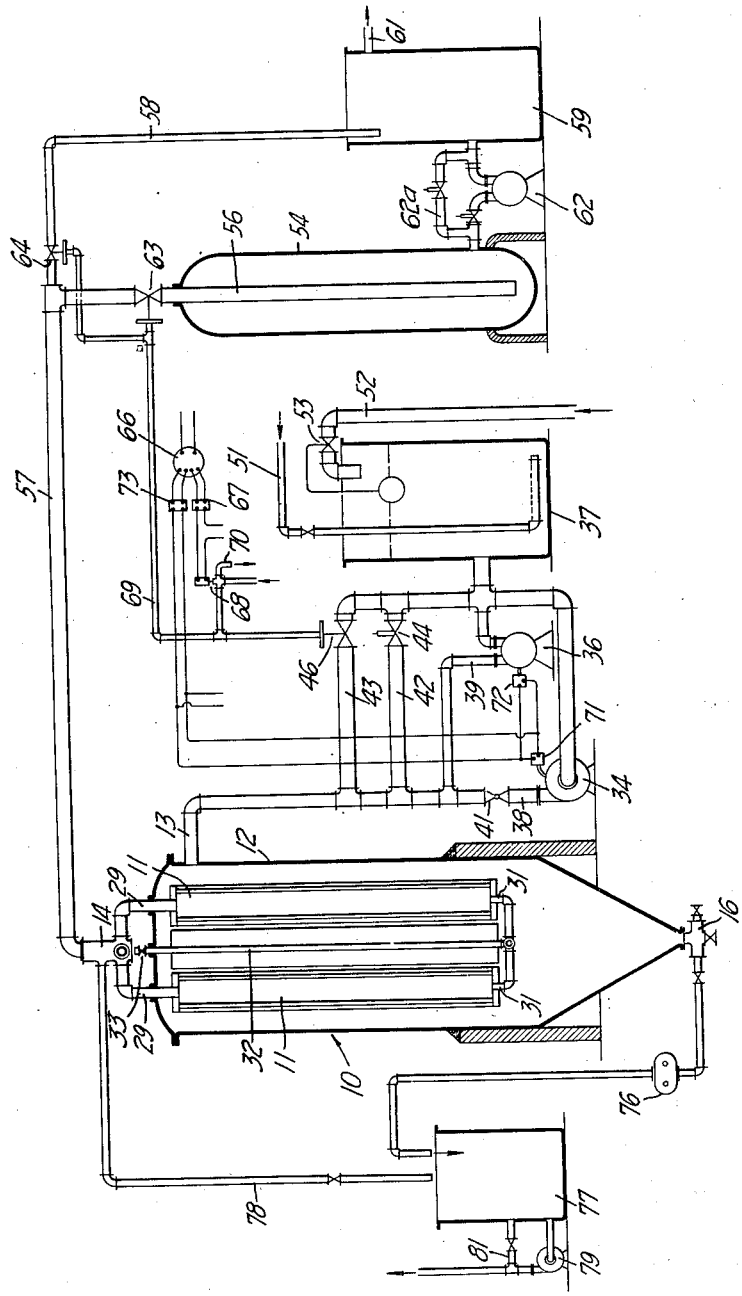

2,041,048

UNITED STATES PATENT OFFICE 2,041,048

FILTER APPARATUS AND METHOD

Heinz H. Chesny, San Mateo, Calif., assignor to Marine Chemicals Company, Ltd., San Francisco, Calif., a corporation of Delaware Application July 31, 1933, Serial No. 682,903

9 Claims. (Cl. 210—184)

This invention relates generally to apparatus and methods for the removal of solid material from liquids by filtration. It has particular application to feed materials containing solids of relatively fine subdivision, which tend to form an impervious filter cake.

It is an object of the invention to provide an apparatus and method of the above character which will afford relatively high capacity and efficiency, without undue expense in plane equipment.

A further object of the invention is to provide a novel means and method for the removal of filter cake from a filtering medium. In this connection the present invention is characterized by the use of a reverse hydraulic surge thru a flexible filter membrane which not only effects a cleansing of the pores of the membrane, but which also actually distorts the membrane to dislodge the filter cake by mechanical action.

A further object of the invention is to provide improved automatic features appertaining to filter apparatus, whereby the apparatus of the present invention may be continued in operation with a minimum of manual supervision.

Further objects of the invention will appear from the following description in which the preferred embodiment of the invention has been set forth in detail in conjunction with the accompanying drawings.

Referring to the drawings:

Figure 1 is a diagrammatic view, in side elevation and in cross section, illustrating apparatus incorporating the present invention.

Fig. 2 is a side elevational view, in cross section, illustrating a filter element such as I prefer to utilize with the apparatus of Fig. 1.

Fig. 3 is a cross sectional detail taken along the line 3—3 of Fig. 2.

Fig. 4 is a cross sectional detail taken along the line 4—4 of Fig. 2, and illustrating the flexible filter membrane in both distended and collapsed positions.

The apparatus as illustrated in Fig. 1 of the drawings consists of a filter designated generally at 10, together with other equipment which will be presently described. While certain features of novelty reside in the manner in which the filter cooperates with other equipment, the filter itself incorporates certain novel features, and as illustrated consists of a plurality of filter elements 11 disposed within a closed receptacle 12. Pipe 13 forms an inflow connection for introducing liquid feed material into the receptacle 12, while the header 14 forms an outflow connection for the removal of filtrate. Thickened or concentrated solid material separated from the feed, can be removed thru the lower pipe connection 16.

Good results have been secured by utilizing filter elements constructed as illustrated in Figs. 2 to 4 inclusive. In this instance each element includes a grill structure formed of upper and lower closures 17 and 18 respectively, which are substantially circular in contour. Extending between these end closures are the longitudinal bars 19, which are spaced circumferentially, as shown in Fig. 3. To form a convenient mounting for these bars, the inner faces of closures 17 and 18 have been shown provided with radial slots 21, within which the ends of the bars are fitted. Rods 19 can be strengthened against external pressure by a plurality of intermediate spacer discs 22. Surrounding the bars 19 there is a suitable flexible filter membrane 26, as for example a lock weave cotton cloth of considerable strength. In the modification illustrated this membrane 26 is bag-like in shape, and when distended is substantially cylindrical. The ends of the membrane are sealed with respect to the end closures 17 and 18, as for example by means of suitable packing 27 and clamping rings 28. At the upper end of the filter element communication is established to the interior of the membrane 26 thru the pipe 29. At the lower end of the filter element communication is similarly established to the interior of the membrane thru the pipe 31. Referring to Fig. 1, it will be noted that the pipes 29 for each of the filter elements connect with the common header 14, while the lower pipes 31 connect with the common vertical pipe 32, which in turn extends to the exterior of receptacle 12, where it is provided with a closure valve 33.

Referring to Fig. 2, it will be noted that the membrane 26 is shown in solid lines in engagement with the bars 19, which corresponds to a collapsed condition of the membrane when the pressure surrounding the filter element exceeds the internal pressure. The filter membrane is also shown distended in dotted lines, which position it assumes when the internal pressure of the filter element exceeds the external pressure. To enable the filter membrane to assume these two positions, it is evident that the circumference of the membrane must be somewhat greater than the external circumference of the cylinder defined by the bars 19. Fig. 3 shows the distended position of the membrane 26 in dotted lines, and the collapsed position upon bars 19 in solid lines. When collapsed it will be noted that portions 26a of the flexible membrane are folded or pressed inwardly between the bars 19. However when distended the membrane assumes a regular or ballooned contour. As will be presently explained, these two different positions of the flexible filter membrane are of particular significance in effecting removal of accumulated filter cake. The spacing between bars 19 should be such as to secure the results desired. In practice a spacing of ½ to ¼ inch has been satisfactory.

With respect to other parts of the equipment utilized in conjunction with the filter, in Fig. 1, I have shown pumps 34 and 36 for supplying the liquid feed material under pressure to the filter. Pump 34 is of relatively high capacity, but is not capable of delivering the feed material into the filter receptacle 12 at a pressure of the order desired during the major part of the normal filtering cycle. Pump 36 is relatively lower in capacity compared to pump 34, but is capable of delivering the feed material at a relatively higher pressure. The inflow sides of both these pumps are connected to a storage reservoir 37, for receiving and storing the liquid feed material to be subjected to filtration. The discharge pipes 38 and 39 respectively for the pumps 34 and 36, are both connected to the inflow pipe connection 13 for the filter receptacle 12. Interposed in the discharge pipe 38 from pump 34 there is a fluid-operated check valve 41, which is arranged to prevent back flow of fluid material. A bypass circuit is also shown about pumps 34 and 36, which includes the pipes 42 and 43 provided with valves 44 and 46. Bypassing of fluid material thru pipe 42 is controlled by the valve 44, which permits maintenance of the desired operating pressure in receptacle 12.

With certain types of feed materials it is desirable to provide for heat treatment to facilitate filtration. This applies to a feed material consisting of a suspension of magnesium hydroxide in water, with which my apparatus has been used successfully for the separation of magnesium hydroxide in concentrated form. Thus associated with reservoir 37 I have shown a pipe 51 thru which live steam can be injected into the body of the fluid feed material. Pipe 52 serves to introduce the feed material into reservoir 37, a float controlled valve 53 being provided for maintaining a desired liquid level.

In the operation of my apparatus the normal filtering cycle is periodically interrupted, and a back flow surge of liquid under pressure is caused to flow thru the filtering elements 11. Rather than to carry out this back flow surge by the use of fresh water or other additional liquid, it is desirable to store a portion of the filtrate for this purpose. Thus I have shown a pressure receiver 54 having a discharge pipe 56 communicating with its lower portion. Pipe 56 communicates with pipe 57, thru which filtrate is removed from header 14. Pipe 58 also communicates with pipe 57, and delivers filtrate to the storage tank 59. From storage tank 59 a portion of the filtrate is removed thru pipe 61 for final delivery, and another portion is delivered by pump 62 to the pressure receiver 54. A valve 63 controls flow of filtrate thru pipe 56 to the pipe 57, and valve 64 controls flow of filtrate to the storage tank 59. Since the receiver 54 is closed, air is trapped above the filtrate delivered from pump 62, and the compression of this air serves to build up a relatively high pressure available for delivering a back flow surge of filtrate thru pipe 57, upon opening valve 63. The amount and delivery pressure of the back flow liquid is regulated by adjustment of the by-pass 62a about pump 62.

It is desirable to effect operation of valves 46, 63 and 64 automatically. Thus for this purpose I have shown a timing device 66 provided with electrical contacts adapted to be opened and closed at predetermined time intervals. Certain of these contacts are connected to an electrical circuit which serves to control the relay 67. Relay 67 in turn is connected to an electrical circuit which serves to control opening and closing of an electrical solenoid operated valve 68. This valve 68 in turn serves to control admission of water or other fluid under pressure to the piping 69. When solenoid valve 68 closes to interrupt communication between piping 69 and the source of supply, the water or other fluid in this piping is vented thru branch pipe 70. Piping 69 connects with various operators, as for example operators of the diaphragm type, which are mechanically connected to or included in the construction of valves 46, 63, and 64. The arrangement is such that when pressure is applied to piping 69, valves 46 and 63 are opened, and at the same time valve 64 is closed.

Simultaneously with the reversal of the positions of valves 46, 63 and 64, I have also made provision for interrupting operation of pumps 34 and 36. Thus these pumps can be driven by electrical motors which in turn are provided with electrical starters 71 and 72. A relay 73 is operated by timing device 66, and serves to control an electrical circuit for starters 71 and 72.

Timing device 66 may vary in construction in accordance with operating requirements. Good results have been secured by using a small synchronous alternating current motor mechanism of the clockwork type, driving a pair of adjustable cams, which in turn actuate contacts for controlling relays 67 and 73. The adjustments afforded should permit a variation in the periods with which relays 67 and 73 are energized. Thus the electrical starters of pumps 34 and 36 are operated by relay 73. Relay 73 is operated in turn by the timing device 66. Timing device 66 consists essentially of two cams rotated by a telechron clock. The cams may be adjustable so as to permit a variation in the periods during which relays 73 and 67 are energized.

Provision for handling the concentrated solid material removed from the lower portion of the filter receptacle 12, will of course depend upon the feed material with which the apparatus is being used, and upon varying operating requirements. When operating the apparatus upon feed material consisting of a suspension of magnesium hydroxide in water, the concentrate in the lower portion of filter receptacle 12 is removed thru a suitable pump 76, and delivered to the storage tank 77. Pump 76 is operated substantially as a rotary valve in order to remove the concentrate at a uniform and predetermined rate in accordance with the maintenance of a body of concentrate in the lower truncated conical portion of receptacle 12. A pump 79 connects with the tank 77 for delivering the repulped material for final delivery. The outflow side of this pump can be provided with a bypass 81 leading back into the storage tank 77.

Operation of the apparatus disclosed above is as follows:—Filter receptacle 12 is always maintained filled with liquid, so that the filter membranes are at all times completely immersed out of contact with air. For purposes of explanation it will be presumed that the apparatus is operating upon feed material consisting of a suspension of magnesium hydroxide in water, and that feed material of this type is being supplied to the storage tank 37, thru pipe 52. It will also be presumed that pumps 34 and 36 are in continuous operation, that valves 46 and 63 are closed, and valve 64 open. At the beginning of a filtering cycle there is substantially no accumulated filter cake upon the filter membranes, and the pressure within the filter receptacle 12 is substantially below that which pump 34 is capable of supplying. Therefore for a preliminary period during the filtering cycle, the majority of the feed material is supplied to the filter receptacle 12 by pump 34 and check valve 41 remains opened. Filtrate is removed by way of lines 57 and 58, to the storage tank 59. After a quantity of feed material has been introduced into receptacle 12 sufficient to cause a deflation of the filter bags, which finally collapse upon bars 19 substantially as shown in Fig. 3, an increase of pressure occurs within receptacle 12 and in line 13, until a pressure value is attained substantially equal to the available pressure from pump 34. At that time check valve 41 automatically closes, and the feed material is now supplied to the filter receptacle solely by the relatively high pressure pump 36.

While the filtering cycle is proceeding, pump 62 is continuously supplying a portion of the filtrate to the pressure receiver 54. Pressure gradually builds up within this receiver, due to compression of the trapped air. Near the end of the filtering cycle the pressure in chamber 54 is of a relatively high value, which in practice may be even greater than the pressure with which the feed material is being supplied to the filter receptacle from pump 36. Likewise by this time a substantial filter cake has accumulated upon the flexible membrane. Timing device 66 now causes relay 73 to disrupt the current supplied to the pump starters 71 and 72, thereby causing pumps 34 and 35 to stop. Simultaneously timing device 66 causes opening of solenoid 68, to apply pressure to the piping 69. Valves 46 and 63 are now opened, and valve 64 simultaneously closed. Opening of valve 46 immediately relieves the pressure within the filter receptacle 12, since the feed material may now flow back thru pipe 43, to the storage tank 37. Opening of valve 63 places the high pressure filtrate in chamber 54, in communication with pipe 57, and therefore a hydraulic surge reverses the differential pressure upon the filter elements 11. As a result the flexible filter membranes are immediately ballooned, as illustrated by dotted lines in Fig. 3. Ballooning of the filter membranes causes a sluffing off of the filter cake, by mechanical action due to the change in shape or contour which is occasioned, and because of a cleansing of the pores of the filter membranes. The filter cake which has been dislodged from the filter membranes settles by gravity, and accumulates in the lower portion of the receptacle 12 for removal. This reverse flow action is of such a timed duration that before the next filter cycle is commenced, all of the filter cake has settled to a point below the lower ends of the filter elements. Timing device 66 now reestablishes the next filter cycle, by closing solenoid valve 68, thus causing valves 46 and 63 to be closed and valve 64 to be opened, and by restarting pumps 34 and 36. The next filter cycle now proceeds in substantially the same manner which has been previously described.

In actual practice, as when operating upon magnesium hydroxide suspension, the duration of the reverse hydraulic surge is only a small fraction of the filtering period. Thus with a filtering cycle of about 10 minutes in duration, the time required for the reverse hydraulic flow may be about 20 seconds. This characteristic of my apparatus and method insures high capacity over a given period of continuous operation. The pressures utilized may vary in accordance with the type of feed material utilized and in accordance with operating requirements. With magnesium hydroxide suspension I have permitted the pressure of the feed material to build up to about seventy or eighty pounds per square inch at the end of the filtering cycle, with a slightly higher maximum pressure within the receiver 54.

The particular arrangement of pumps which I have illustrated for supplying the feed material to the filtering apparatus insures proper pressures and flow rates of the feed material, with a minimum outlay for equipment of this character. Since the filtering membranes are always immersed, they are not subject to deterioration by contact with the atmosphere, and likewise the filter cake is not subjected to contamination, oxidation, or absorption of gases.

I claim:

1. In a filtering apparatus of the character described, a flexible filter membrane, means for causing a liquid feed material under pressure greater than atmospheric to flow continuously through said membrane from one side thereof for a normal filtering period, means for causing the membrane during said flow to assume a form corresponding to a series of spaced parallel grooves or folds which open toward said one side to receive filter cake, means for tensioning the filter membrane in a direction longitudinally of said grooves during said filtering period, to avoid folding laterally thereto, and means for impressing a back flow hydraulic surge on the membrane to cause the membrane to be ballooned without grooves or folds, whereby accumulated filter cake is dislodged.

2. In a system of the character described, a filtering apparatus having an inflow connection for introducing liquid feed material and also having an outflow connection for the removal of liquid filtrate, said apparatus also including a filter medium upon which a filter cake is deposited, pumping means for delivering liquid feed material to said filtering apparatus, said pumping means including a low pressure relatively high capacity liquid pump together with a relatively low capacity and relatively high pressure liquid pump, and a check valve interposed between the outflow sides of said pumps, whereby the high capacity pump is rendered ineffective to deliver liquid feed material to the filtering apparatus when the inflow pressure to said apparatus exceeds a given value.

3. In a system of the character described, a filtering apparatus of the pressure type having an inflow connection for introducing liquid feed material under pressure and having an outflow connection for removal of liquid filtrate, said apparatus also including a filter medium upon which a filter cake is deposited, pumping means for introducing liquid feed material under pressure into said apparatus, said pumping means including a high capacity low pressure liquid pump, together with a relatively low capacity and relatively high pressure pump, said pumps being connected in parallel, a check valve interposed between the outflow sides of said pumps whereby delivery of feed material from said low pressure pump is discontinued when the pressure with which feed material is introduced into the filtering apparatus exceeds a given value, means including a closed receiver for storing a portion of the filtrate removed from the filtering apparatus under pressure, and time control means serving to normally permit said pumping means to deliver feed material to said filtering apparatus while a portion of said filtrate is being stored under pressure in said receiver, and to periodically interrupt such normal operation and cause a reverse hydraulic surge of filtrate from said receiver to said filtering apparatus to dislodge an accumulated filter cake.

4. In a system of the character described, a closed chamber, one or more generally cylindrical-shaped grill structure within said chamber, said grill structure including a plurality of circumferentially spaced upright bars, a flexible sleeve-shaped filter membrane surrounding said bars, means for anchoring both the upper and lower ends of said membrane to said structure at points adjacent the upper and lower ends of said bars, said membrane when distended by pressure within the same being of a diameter substantially greater than the diameter of said structure, means for pumping liquid feed material into the space surrounding said membrane and under a pressure substantially greater than atmospheric and sufficient to collapse the filter membrane upon said bars with the formation of outwardly opening folds between the bars, the interior of the folds serving to receive filter cake, means forming an outlet for filtrate from the interior of said membrane, and means for periodically applying to the interior of the membrane a relatively high-pressure hydraulic surge whereby the membrane is distended to balloon-like form to dislodge filter cake from the same, the hydraulic surge being of relatively short duration as compared with the duration of the filtering cycle.

5. In a system of the character described, a closed chamber, a generally cylindrical-shaped grill structure within said chamber, said grill structure including a plurality of circumferentially spaced upright bars, a flexible sleeve-shaped filter membrane surrounding said bars, means for anchoring both the upper and lower ends of said membrane to said structure at points adjacent the upper and lower ends of said bars, said membrane when distended by pressure within the same being of a diameter substantially greater than the diameter of said structure, means for pumping liquid feed material into the space surrounding said membrane under a pressure substantially greater than atmospheric and sufficient to collapse the filter membrane upon said bars with the membrane forming outwardly opening folds between the bars, the interior of the folds serving to receive filter cake, means forming an outlet for filtrate from the interior of said membrane, said anchoring means comprising members serving to retain the upper and lower ends of the membrane on circular areas having a diameter greater than the diameter of the cylinder defined by the outer edges of the bars but less than the diameter to which the sleeve is distended by pressure within the same, whereby the membrane is tensioned in a direction longitudinally of the bars when collapsed by external pressure, and means for periodically applying a relatively high-pressure hydraulic surge to the interior of the membrane whereby the membrane is distended to balloon-like form to dislodge filter cake from the same, the hydraulic surge being of relatively short duration as compared with the duration of the filtering cycle.

6. In a system of the character described, a closed chamber, a generally cylindrical-shaped grill structure within said chamber, said grill structure including a plurality of circumferentially spaced upright bars, a flexible sleeve-shaped filter membrane surrounding said bars, means for anchoring both the upper and lower ends of said membrane to said structure at points adjacent the upper and lower ends of said bars, said membrane when distended by pressure within the same being of a diameter substantially greater than the diameter of said structure, means for pumping liquid feed material into the space surrounding said membrane under a pressure substantially greater than atmospheric and sufficient to collapse the filter membrane upon said bars with the filter membrane forming outwardly opening folds between the bars, the spacing between the bars being such that there is substantially no contact between the opposed side faces of the bars and the side surfaces of the folds, the interior of the folds serving to receive filter cake, means forming an outlet for filtrate from the interior of said membrane, and means for periodically applying a relatively high-pressure hydraulic surge to the interior of the membrane whereby the membrane is distended to balloon-like form to dislodge filter cake from the same, the hydraulic surge being of relatively short duration as compared with the duration of the filtering cycle.

7. In a filtering apparatus, a closed chamber, a generally cylindrical-shaped grill structure within said chamber, said grill structure including a plurality of circumferentially spaced upright bars, a flexible sleeve-shaped filter membrane surrounding said bars, means for anchoring both the upper and lower ends of said membrane to said structure at points adjacent the upper and lower ends of said bars, said membrane when distended by pressure within the same being of a diameter substantially greater than the diameter of said structure, means for introducing liquid feed material into the space surrounding said membrane and under a pressure sufficient to collapse the filter membrane upon said bars with the formation of outwardly opening folds between the bars, the interior of the folds serving to receive filter cake, means forming an outlet for filtrate from the interior of said membrane, and means for applying hydraulic pressure to the interior of the membrane whereby the membrane is distended to balloon-like form to dislodge filter cake from the same.

8. In a filtering apparatus of the character described, a closed chamber, a generally cylindrical-shaped grill structure within said chamber, said grill structure including a plurality of circumferentially spaced upright bars, a flexible sleeve-shaped filter membrane surrounding said bars, means for anchoring both the upper and lower ends of said membrane to said structure at points adjacent the upper and lower ends of said bars, said membrane when distended by pressure within the same being of a diameter substantially greater than the diameter of said structure, means for introducing liquid feed material into the space surrounding said membrane under a pressure sufficient to collapse the filter membrane upon said bars with the membrane forming outwardly opening folds between the bars, the interior of the folds serving to receive filter cake, means forming an outlet for filtrate from the interior of said membrane, said anchoring means comprising members serving to retain the upper and lower ends of the membrane on circular areas having a diameter greater than the diameter of the cylinder defined by the outer edges of the bars but less than the diameter to which the sleeve is distended by pressure within the same, whereby the membrane is tensioned in a direction longitudinally of the bars when collapsed by external pressure, and means for applying a relatively high-pressure hydraulic surge to the interior of the membrane whereby the membrane is distended to balloon-like form to dislodge filter cake from the same.

9. In a filtering apparatus, a closed chamber, a generally cylindrical-shaped grill structure within said chamber, said grill structure including a plurality of circumferentially spaced upright bars, a flexible sleeve-shaped filter membrane surrounding said bars, means for anchoring both the upper and lower ends of said membrane to said structure at points adjacent the upper and lower ends of said bars, said membrane when distended by pressure within the same being of a diameter substantially greater than the diameter of said structure, means for introducing liquid feed material into the space surrounding said membrane under a pressure substantially greater than atmospheric and sufficient to collapse the filter membrane upon said bars with the filter membrane forming outwardly opening folds between said bars, the spacing between the bars being such that there is substantially no contact between the opposed side faces of the bars and the sides surfaces of the folds, the interior of the folds serving to receive filter cake, means forming an outlet for filtrate from the interior of said membrane, and means for applying a relatively high-pressure hydraulic surge to the interior of the membrane whereby the membrane is distended to balloon-like form to dislodge filter cake from the same.

HEINZ H. CHESNY.